350-1.1
XR 2,994,053
TX 3010N

July 25, 1961 R. D. DE WAARD 2,994,053

SELECTIVE BOLOMETER

Filed May 24, 1960

INVENTOR.
RUSSELL D. DeWAARD

BY Robert Ames Norton

ATTORNEY

2994053
OR IN 338/18

2,994,053

SELECTIVE BOLOMETER

Russell D. De Waard, Old Greenwich, Conn., assignor to Barnes Engineering Company, Stamford, Conn., a corporation of Delaware Filed May 24, 1960, Ser. No. 31,437
10 Claims. (Cl. 338—18)

Figure 1:
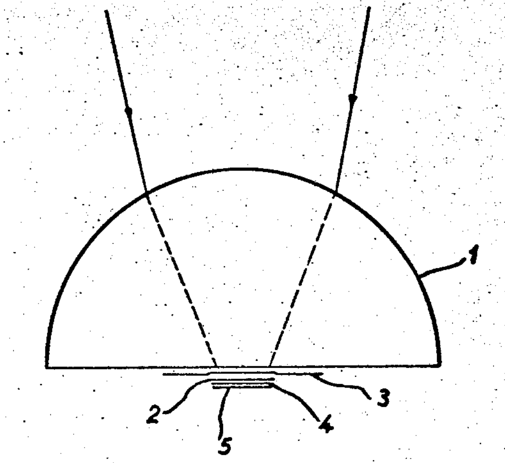

This invention relates to improved thermistor bolometers, and more particularly to improved selective immersed thermistor bolometers.

Thermistor bolometers have achieved great commercial success as infrared detectors, and in fact are the standard detectors for the middle and far infrared. They have the great advantage that they can be used with any kind of infrared radiation and are not limited to particular regions of the infrared, usually the nearer infrared, which constitutes so serious a limitation for photodetectors.

The standard material for thermistors has been a mixture of metallic oxides such as nickel or manganese oxides which are fused to form resistors of very high negative temperature coefficients.

Great as has been the usefulness of the metal oxide thermistors they still leave much to be desired for certain uses, particularly in instruments where infrared radiation is chopped before it strikes a thermistor bolometer. This permits producing an A.C. signal instead of a D.C. signal, which makes simpler and better electronic circuits possible. In order to respond to interrupted radiation the thermistor in the bolometer has to be heated and cooled. The cooling is taken care of by attaching the thermistor in good heat conducting relation with a relatively large backing block of a material of high heat conductivity such as aluminum oxide, beryllium oxide, and metals like copper. The backing block operates as a heat sink and the rate at which the thermistor responds is then determined largely by the heat diffusivity of the thermistor material. As a result there is a definite limitation on the frequency of chopping which is possible. In general, even under the best circumstances time constants of a millisecond, or a major fraction of a millisecond, represent the limit. This should be compared with the time constants of photoconductive infrared detectors which may be of the order of a microsecond. In other words there is a gap in time constants of several orders of magnitude.

Sensitivity of a thermistor is determined by its temperature coefficient and at 300° K. 4.2 percent resistance change per degree C. is about the limit. This rather modest sensitivity while thoroughly practical for many instruments requires a maximum concentration of infrared energy on the thermistor. This has made it necessary to adopt optical configurations of maximum efficiency. One of the simplest and best methods of increasing the intensity of infrared radiation on a thermistor bolometer is to immerse the bolometer, usually in a germanium lens. The enormous refractive index of germanium, four, permits a great increase in detector efficiency and even refractive material of more modest refractive index, such as silicon, barium titanate, crystalline aluminum oxide, referred to loosely in the art as sapphire, and the like have been used in immersed bolometers to produce varied degrees of increased response. In the case of refractive material which is an electrical conductor, such as germanium and silicon, the thermistor has to be insulated, which is usually effected by a very thin film of selenium.

The present invention is of particular importance in the field of immersed thermistor bolometers, and greatly widens the field for detectors of this type. In particular the present invention permits for the first time produc an immersed thermistor bolometer which can be m selecitve for certain wavelength bands in the infrared. should be understood that immersed thermistor boloi ters are not claimed as such in the present invention they constitute the subject matter of the copending plication of Wormser, Serial No. 459,076, filed Sept ber 29, 1954. Improved immersed thermistor boloi ters, however, are included as a specific modification the present invention.

Essentially the present invention utilizes as thermis instead of oxides the metallic semiconductors germani or silicon in extremely thin films. The heat conducti and heat diffusivity of these elements is orders of ma tude greater than the ordinary oxide material norm used, and the volumetric heat capacity is less than hal great. As a result these semiconductor thermistors the present invention have time constants in micro onds, and under favorable conditions approach time c stants of the order of magnitude of those which are av able with infrared photodetectors. An entirely new f of utility for thermistor bolometers is thereby ope and the comparatively large time constant which co tuted a limitation for ordinary thermistor material longer constitutes a bottleneck for instrument desig The enormous reduction in time constant which is sible with germanium or silicon is obtained without compromise in sensitivity. In fact there is an incre Germanium has a higher temperature coefficient than best of the metal oxide materials and silicon is alr twice as high.

While the very short time constants possible with thin films of silicon or germanium permit extremely l radiation chop frequencies, normally these extremely s time constants are not necessary. Lower frequencies mit increased sensitivity of the detector either when m ured in terms fo responsivity or detectivity. This ca seen from a consideration of the general equation detector responsivity which in simplified form, consi ing only the variable quantities and omitting constant as follows:

$$R=\frac{VZ}{\sqrt{1+(2\pi ftZ)^2}}$$

In the equation V is the peak bias voltage and Z the t mal impedance which is usually in the form of a layer of material of low heat conductivity between thermistor and its heat sink. The equation really incl the heat capacity of the thermistor but with thermis of the same material and the same general shape th proportional to thickness designated by $t$ in the equa Z, of course, is used in its usual sense to designate pedance.

Looking at the equation it will be seen that as the quency is lowered responsivity increases. However, change in responsivity with changing of $t$ and Z i important matter and one in which the thermistor bol eters of the present invention present a marked ad tage. If the frequency is lowered the denominator o fraction is affected only by the product of $t$ and Z the results are very different depending on whether increased or Z is increased. The numerator involves voltage and impedance. The peak voltage itself is a f tion of thickness and impedance because the heating to the bias voltage must be removed as fast as it is duced. As a result voltage is inversely proportion the square root of $tZ$, the time constant. If this i creased by increasing Z responsivity, therefore, for a time constant equals $$R=\sqrt{\frac{Z}{1+(2\pi ftZ)^2}}$$

It will be seen that if the time constant is increased by increasing Z only responsivity increases as the square root of Z. If, however, the time constant is increased by increasing $t$ then responsivity decreases in proportion to the square root of $t$. The situation is not quite as bad with detectivity which is responsivity divided by noise as the noise is also inversely proportional to the square root of $t$. Therefore, detectivity does not change but there is no increase.

From the above discussion it will be apparent that at lower frequencies for a given increase in time constant the responsivity will be much greater if this increase results from increased thermal impedance. Putting it another way the thinner the thermistor can be kept and still remain uniform and otherwise electrically satisfactory the greater the increase in responsivity which is possible by increasing the time constant. Since the thermistors of the present invention can be made much thinner and so with much lower heat capacity than those hitherto available the invention has the added advantage that it may be used to increase responsivity and detectivity of a thermistor bolometer at more moderate frequencies to a greater degree than can be effected with other materials. Increased thermal impedances, which should be carefully controlled to produce a desired increased time constant, can best be effected by interposing a precisely controlled but thin layer of material of low thermal conductivity, for example, a film of polyethylene terephthalate. The general production of thermistor bolometers with controlled and increased time constants by the interposing of precisely dimensioned layers of low thermal conductivity between thermistor and heat sink is not claimed in the present application but forms the subject matter of the copending applications of Wormser and De Waard, Serial No. 528,797, filed August 16, 1955 now Patent No. 2,963,673 and Wormser and De Waard, Serial No. 528,798, filed August 16, 1955 now Patent No. 2,963,674. It is, however, an important advantage of the present invention that very thin reliable thermistors can be produced which make for maximum sensitivity.

From the above discussion it might be thought that there would be no limit to the increase in sensitivity of the detectors by making the germanium or silicon films thinner and thinner. There is, however, a manufacturing limit on thickness below which reliable and uniform thermistors cannot be assured unless the thermistor is uniform it cannot, of course, have uniform electronic conductivity. This limit, however, is at least an order of magnitude thinner than anything which has been possible with the metal oxide thermistors which were used in the past.

As has been pointed out above, the most striking advantages of the present invention are obtained with selective immersed thermistor bolometers which could not be produced at all with materials hitherto used. Selective thermistor bolometers were developed using coatings or layers on a thermistor of material which absorbed in certain bands of the infrared. When other infrared radiation was kept from heating the thermistor, for example by suitable reflecting coatings, a detector was produced which responded substantially only to the wavelength band in which this selective absorbing coating absorbed. Only radiation in this band resulted in heating. Selective thermistor bolometers as such are not a part of the present invention, but constitute the subject matter of the application of Barnes, Wormser and De Waard, Serial No. 641,957, filed February 25, 1957 now Patent No. 2,981,913. It was impossible in the past to produce selective thermistor bolometers which were immersed. If the absorbing layer was next to the lens immersion was lost, and if the thermistor was next to the lens infrared radiation did not penetrate to the absorber because the thermistor material hitherto used was substantially opaque to the infrared.

All this is changed by the present invention because the thin germanium flakes which are used in the present invention are transparent to the infrared from about 1. to beyond 25$\mu$. In the case of thermistors of silicon the grade of purity now available this transparency is complete as there are some absorption bands in the inf red even for thin films of silicon. Therefore, wh transparency over a very wide range is necessary g manium thermistors are preferred in spite of the m higher temperature coefficient of silicon. Howev where the infrared response is within the regions for wh silicon is transparent its higher sensitivity may be us The infrared rays carry straight through the thin g manium or silicon thermistor and are selectively absorb in the absorbing coating which can be enhanced by p viding an additional mirror coating which again reflects rays through the selective absorber, the transparent th mistor and the lens. The present invention thus for first time permits a selective immersed thermistor bolo ter and opens up the whole field of selective thermis bolometers to the added sensitivity of immersion.

It should be noted that the lens in the case of immersed thermistor bolometer acts as a heat sink as v as a lens, and that the reflecting coatings are on the posite side of the thermistor. They are, therefore, tirely unaffected by any optical requirements other t their absorption spectrum. This permits great flexibi and allows for the use of any materials so that the pro absorption can be obtained almost anywhere in the able infrared spectrum. Of course, where nonselec thermistor bolometers are required, whether immerse unimmersed, the germanium or silicon thermistor n be blackened. This is a common procedure even oxide thermistors and the conventional blackening ag such as gold black, platinum black and the like, be used.

Figure 2:
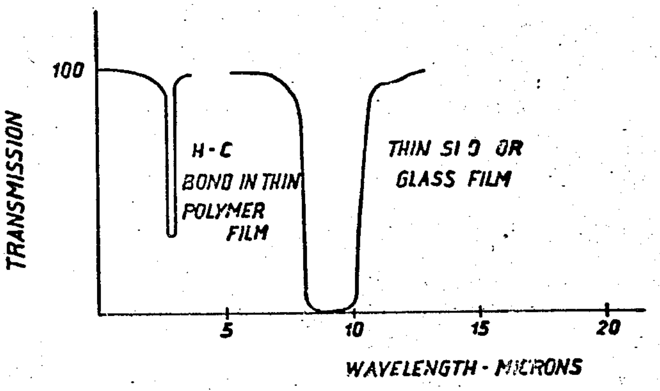

The invention will be described in greater detai conjunction with the drawings in which:

FIG. 1 is a diagrammatic cross section through a se tive immersed thermistor bolometer, and FIG. 2 is a composite infrared spectrum showing typical absorption bands for different materials.

FIG. 1 shows an infrared lens 1 of suitable mat such as sapphire, germanium, silicon and the like, a manium or silicon thermistor 2, an insulating lay (necessary in the case of electrically conductive le such as those of germanium), a selective absorbing c ing 4 and a mirror coating 5. For clearness the t mistor and the various layers are not to scale, the ther tor and the insulating layer being enormously exagger in thickness as is the mirror layer. The electrical con tions to the thermistor are not shown as these are con tional and are of exactly the same design as with t mistors of the ordinary metal oxide material. The la 2, 3, 4 and 5 are extremely thin. Therefore, it would be possible to show them clearly to scale. Accordi the layers, which are represented by lines, are sh slightly exploded in FIG. 1. In an actual instrument layers are in intimate contact and there are no air sp between them.

In discussion of the operation of the selective imme bolometer we will assume, for example, that the abs ing layer is a thin quartz or glass layer. Infrared striking the lens 1 are transmitted from about 1.8$\mu$ to yond 25$\mu$. The transparent thermistor which may b germanium is transparent through the whole of this r and in fact even beyond the long wave extreme. Th fore, the infrared radiation from 1.8 to beyond passes through the thermistor and enters the absor layer 4. There is strong absorption in the narrow of about 8 to 10$\mu$ as shown in FIG. 2, the other passing through, striking the mirror 5 and again pa through the absorbing layer, the thermistor and through the lens. Further absorption in the absor band takes place in this reflected path, and as a r the absorbing layer is heated only by the infrared radi within its absorption band. It rises in temperature this temperature is transmitted by conduction to the thermistor. Operation as a selective thermistor bolometer results and by the use of any suitable absorbing layer the bolometer can be made responsive to a preselected band of infrared radiation. For example, if the absorbing layer 4 is a thin film of an organic polymer the absorption will be in the short wave band at about 2.5μ shown in FIG. 2.

The time constant of the system will normally be determined by the absorbing layer as usually the heat capacity of the thermistor will be so low and its diffusivity so high, that it does not limit the time constant. With many absorbing layers it is not possible to reach the extremely short time constants measured in microseconds which is possible with the thermistor alone when it is only blackened and the time constant is determined by its heat capacity and diffusivity.

It will be seen that the present invention for the first time permits an immersed selective thermistor bolometer and also permits bolometers such as immersed thermistor bolometers of non selective type with extraordinarly low time constants. At the same time these new fields which are opened to thermistor bolometers are achieved without drawbacks. The germanium or silicon thermistors are not significantly more expensive or difficult to produce than the usual metal oxide thermistors and there is no degradation of quality. In fact the resulting bolometers may be of even lower noise than the usual type.

In the drawings there has been illustrated a hemispherical immersion lens. The present invention is applicable equally to any type of immersion lens including hyperimmersion lenses where the thermistor is located beyond the center of curvature of the spherical surface. For certain instruments these hyperimmersion lenses present particular advantages and it is a tribute to the flexibility of the present invention that it is useful in any design of immersed thermistor bolometer.

What I claim is:

1. A thermistor bolometer of high sensitivity and controlled time constant comprising in combination and in optical alignment a very thin thermistor acting a a thermal detector of an element selected from the group consisting of germanium and silicon of uniform electronic conductivity and of a thickness such that it is transparent to infrared radiation longer than its cutoff wavelength, and electric connections to said uniformly electronically conducting thermistor, a material having a high absorption in at least one region of the infrared in heat exchanging contact with the thermistor, a heat sink and a precisely uniform layer of material of low conductivity between the thermistor and the heat sink, the thermal impedance presented by the layer being very large compared to the heat capacity of the thermistor.

2. A thermistor bolometer according to claim 1 in which the thermistor material is germanium.

3. A thermistor bolometer according to claim 1 in which the thermistor material is silicon.

4. A thermistor bolometer according to claim 1 in which the heat sink is a lens of infrared transparent material having high heat conductivity, the thermistor is immersed on said lens and the infrared absorbing material is in contact with the unimmersed face of the thermistor.

5. A thermistor bolometer according to claim 4 in which both the lens and the thermistor are of germanium.

6. A thermistor bolometer of low time constant comprising in combination and in optical alignment a thin thermistor of metallic silicon of uniform electronic conductivity and of a thickness to be transparent to infrared radiation longer than its short wavelength cutoff, and electric connections to said uniformly electrically conducting thermistor, a window thereover transparent through a wide range of the infrared spectrum, an infrared absorbing layer in contact with the thermistor and a heat sink in heat conducting contact with the thermistor.

7. A thermistor bolometer of low time constant comprising in combination and in optical alignment a thin layer of germanium of uniform electronic conductivity and of a thickness to be transparent to infrared radiation longer than its short wavelength cutoff, and electric connections to said uniformly electrically conducting thermistor as a thermistor, a window thereover passing a portion of the infrared spectrum and an absorbing coating on the face of the thermistor opposite the window.

8. A selective thermistor bolometer according to claim 7 in which the absorbing coating absorbs selectively at least one predetermined band in the infrared.

9. A thermistor bolometer according to claim 6 in which the absorbing coating is on the side of the thermistor opposite the window.

10. A thermistor bolometer according to claim 9 in which the absorbing coating selectively absorbs at least one band in the infrared.

References Cited in the file of this patent

UNITED STATES PATENTS 2,788,381 Baldwin ---------------- Apr. 9, 1957